United States Patent [19]

Kim

[11] Patent Number: 5,798,883
[45] Date of Patent: Aug. 25, 1998

[54] METHOD FOR SERVO DEFECT MANAGEMENT OF A MAGNETIC DISK IN HARD DISK DRIVE

[75] Inventor: Hack-Bin Kim, Suwon, Rep. of Korea

[73] Assignee: SamSung Electronics Co., Ltd., Kyungki-do, Rep. of Korea

[21] Appl. No.: 628,333

[22] Filed: Apr. 5, 1996

[30] Foreign Application Priority Data

May 12, 1995 [KR] Rep. of Korea ............... 1995 11765

[51] Int. Cl.$^6$ ...................................... G11B 27/36
[52] U.S. Cl. ...................... 360/31; 360/53; 360/75; 360/78.14; 369/58
[58] Field of Search .................. 360/78.04, 75, 360/31, 77.08, 53, 78.14; 369/58; 371/30, 37.8, 40.1, 31

[56] References Cited

U.S. PATENT DOCUMENTS

| | | | |
|---|---|---|---|
| 4,498,146 | 2/1985 | Martinez | 364/900 |
| 4,796,113 | 1/1989 | Hayakawa | 371/10 |
| 4,829,249 | 5/1989 | Matsushita et al. | 324/212 |
| 4,912,576 | 3/1990 | Janz | 360/77.07 |
| 5,087,992 | 2/1992 | Dahandeh et al. | 360/53 X |
| 5,128,946 | 7/1992 | Ogino et al. | 360/53 X |
| 5,202,876 | 4/1993 | Takagi et al. | 350/53 X |
| 5,271,018 | 12/1993 | Chan | 371/10.2 |
| 5,285,327 | 2/1994 | Hetzler | 360/48 |
| 5,394,280 | 2/1995 | Chliwnyj et al. | 360/77.12 |
| 5,434,725 | 7/1995 | Hirose et al. | 360/77.04 |
| 5,465,182 | 11/1995 | Ishikawa | 360/75 |
| 5,583,842 | 12/1996 | Wilson et al. | 360/75 X |

*Primary Examiner*—Andrew L. Sniezek
*Attorney, Agent, or Firm*—Robert E. Bushnell, Esq.

[57] ABSTRACT

A method for controlling a servo system of a hard disk drive of the present invention contemplates reading a servo defect list from a hard disk drive; performing a track seek order on a disk; ascertaining whether a corresponding servo is in the servo defect list; ignoring position information of the corresponding servo, when the corresponding servo is in the servo defect list; estimating position information of a track from position information of a servo immediately preceding the corresponding servo after ignoring the position information of the corresponding servo; performing a predetermined servo control algorithm after estimating the position information of the corresponding servo based on the position information of the servo immediately preceding the corresponding servo; and performing the servo control algorithm after reading out position information from the corresponding servo, when the corresponding servo is not in the servo defect list. According to the present invention, normal position information is used instead of the position information of the corresponding servo in the servo defect list during the operation of the hard disk drive, so that the disturbance is prevented from acting as input data of the servo system and thus the system is stably operated.

10 Claims, 5 Drawing Sheets

METHOD FOR SERVO DEFECT MANAGEMENT OF A MAGNETIC DISK IN HARD DISK DRIVE

CROSS-REFERENCE TO RELATED APPLICATIONS

This application makes reference to, incorporates the same herein, and claims all benefits accruing under 35 U.S.C. §119 from an application for *Method For Controlling Servo System Of Hard Disk Drive* earlier filed in the Korean Industrial Property Office on 12 May 1995 and thereby assigned Ser. No. 11765/1995.

BACKGROUND OF THE INVENTION

1. Technical Field

The present invention relates to a method for recording servo information on a memory disk of a hard disk drive, and more particularly to a servo information recording method of a hard disk drive in which time necessary for detecting servo defect is reduced during the disk manufacturing steps of a hard disk drive, and in which the effect of servo defect on succeeding normal servo regions in the hard disk drive is minimized.

2. Background Art

Generally, it is ideal that a data storage medium such as a magnetic or optical memory disk is completely free from defects on their recording surfaces before it can be used for recording data and servo information on respective data and servo sectors of each concentric track. While the conventional art such as those disclosed, for example, in U.S. Pat. No. 4,498,146 for *Management Of Defects In Storage Media* issued to Martinez, U.S. Pat. No. 4,796,113 for *Method And Apparatus For Automatically Replacing Defective Recording Tracks In Data Storage Apparatus* issued to Hayakawa, U.S. Pat. No. 5,271,018 for *Method And Apparatus For Media Defect Management And Media Addressing* issued to Chan, reveals several techniques for a manufacturer to manage sector defects before data and servo information are recorded onto such a data memory medium, it has been my observation that there is no one available technique that is capable of efficiently and effectively managing defects of servo information after such servo information is recorded on the data memory medium.

For example, in U.S. Pat. No. 4,498,146, Martinez discloses a conventional media defect management technique of a data memory medium in which the manufacturer is required to identify defective tracks and sectors after the manufacture of such data memory medium and compile a list or table of defective tracks and defective sectors so that the defective tracks or sectors can be avoided during operation of the disk drive such as, for example, recording data and servo information on respective non-defective sectors of each track. By contrast, Hayakawa in U.S. Pat. No. 4,796,113, reveals a data storage device constructed to automatically skip the defective tracks of a data memory medium in response to a cylinder access signal so that a read/write head can be positioned on an alternative non-defective track and the manufacturer can be excused from compiling the list of defective tracks of the data memory medium. Alternatively, Chan in U.S. Pat. No. 5,271,018 discloses a unique addressing and defect management technique in which lower memory is contemplated to manage the same number of defective tracks or sectors listed by the manufacturer as disclosed by Martinez '146. As mentioned previously, however, these conventional media defect management techniques are primarily related to the identification and avoidance of defective tracks or sectors so that data and servo information can be recorded on respective sectors of each track of a data storage medium for reliable reproduction. Once data or servo information is recorded on respective sectors of each track of the data storage medium, any defect of the servo information recorded on the data storage medium must be detected and re-recorded before other manufacturing steps can be followed.

For example, in U.S. Pat. No. 5,465,182 for *Recording Method Of Servo Information*, Ishikawa acknowledges a servo information recording technique in which servo information previously recorded on servo sectors of each track of a data storage medium is tested for defect during the assembly of a disk drive even though his improvement primarily seeks to reduce the processing time required to record and verify servo information. In Ishikawa '182, servo information is recorded on a servo surface of the data storage medium by a servo track writer. After the servo information is recorded on the servo surface of the data storage medium starting from the outer track to the inner track, the recorded servo information is read and verified for defect at which point the defective servo region can be re-recorded for quality control. In the conventional servo information recording and defect verification technique, however, if there is a defect in the servo region, the servo information must be re-written and defect verification step must be repeated until there is no defect. Accordingly, it has been my observation that the conventional servo information recording and defect verification technique requires a significant processing time and assembly time which can lead to a general decline in the production of a hard disk drive.

SUMMARY OF THE INVENTION

Accordingly, it is therefore an object of the present invention to provide an improved precess and memory for recording servo information.

It is another object to provide a servo recording method of servo information which can reduce the assembly time that is required to assembly a hard disk drive and thereby improving productivity.

It is also another object of the present invention to provide a servo system of a hard disk drive in which time necessary for detecting defect in the servo surface of a data storage medium is reduced during the disk manufacturing steps of a hard disk drive.

It is further an object of the present invention to provide a servo system of a hard disk drive in which the effect of servo defect of a servo surface of a data storage medium on succeeding normal servo regions in the hard disk drive is minimized.

To achieve the above and other objects, the present invention envisions a method for manufacturing a hard disk drive system which comprises the assembling a head disk assembly; writing a servo on a servo region of the disk; detecting a defect of the servo region where the servo is written; preparing a servo defect list when the defect of the servo region is detected; ascertaining whether the number of defective locations contained in the servo defect list is not less than a predetermined number; returning the steps of writing, reading and defect detecting of the servo when the number of defective locations contained in the servo defect list is not less than the predetermined number; and storing the servo defect list on a predetermined location of the disk in the hard disk drive when the number of defective locations contained in the servo defect list is less than the predetermined number.

The present invention also contemplates a method for controlling a servo system of a hard disk drive by reading a servo defect list from a hard disk drive; performing a track seek order on a disk; ascertaining whether a corresponding servo is in the servo defect list; ignoring position information of the corresponding servo, when the corresponding servo is in the servo defect list; estimating position information of a track from position information of a servo immediately preceding the corresponding servo after ignoring the position information of the corresponding servo; performing a predetermined servo control algorithm after estimating the position information of the corresponding servo based on the position information of the servo immediately preceding the corresponding servo; and performing said servo control algorithm after reading out position information from said corresponding servo, when the corresponding servo is not in the servo defect list.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
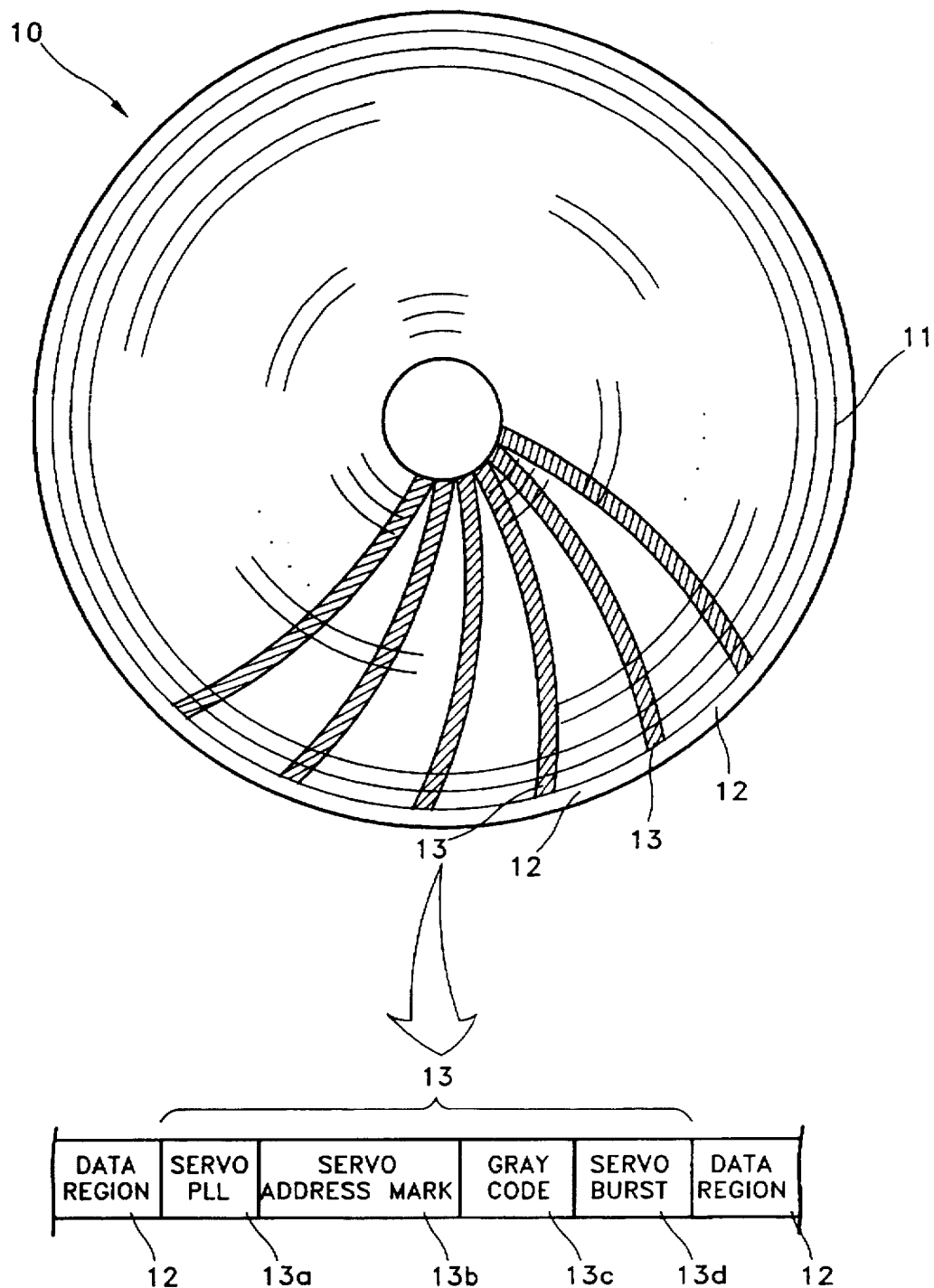
FIG. 1 a plan and a partially cross-sectional views of a disk containing a plurality of servo regions for use in a conventional hard disk drive.

Referring now to the drawings and particularly to FIG. 1, which illustrates a data memory disk 10 comprising a plurality of concentric tracks 11 each track including a plurality of data regions 12 and servo regions 13 for use in a conventional hard disk drive. Typically, in order to control the position of a read/write head, an embedded servo system of the hard disk drive uses position information of the head provided by an auxiliary circuit such as, for example, an application specific integrated circuit (ASIC) for input data. Further, an embedded servo system used in the hard disk drive uses a portion of a track layout to write servo information. As shown in FIG. 1, each track 11 on the data memory disk 10 is evenly divided into a plurality (for example, 64 or 72) of data regions 12 and servo regions 13. Each servo region 13 is further divided into a servo phase locked loop area (PLL) 13a, a servo address mark area 13b, a gray code area 13c and a servo burst area 13d for generating a position error signal (PES). Of the components of servo area 13, the necessary input data for controlling the position of the read/write head is the gray code contained in the gray code area 13c and the PES provided from the servo burst area 13d. The gray code contained in the gray code area 13c is a number assigned per each track of the disk and represents the position of the track. The detailed position information PES of the track is written in the servo burst area 13d.

Meanwhile, the defect in the servo region of the disk generally functions as an input disturbance of the servo system, and an output disturbance different from the desired one is generated depending on which data is affected by the input disturbance. The defect typical includes a defect of the servo address mark, a defect of the gray code and a defect of the servo burst. When there is no defect in the servo address mark area 13b, the gray code and PES information are not available. In this case, there is no input data during the detection of one servo region. For the gray code, when the external auxiliary circuit such as the ASIC detects an error, the gray code and PES information are not available, and when the ASIC does not detect errors, the defect of the gray code functions as an impulsive disturbance. For the servo burst, there is no auxiliary circuit for detecting an error with respect to the PES after the analog/digital conversion and therefore the defect of the servo burst functions as the impulsive disturbance to the PES.

For the above described defect, in the situation of a defect in the servo address mark area 13b, the disturbance typically does not affect the servo system. In the situation of a defect in the gray code area 13c and the servo burst area 13d, the impulsive disturbance, however, functions as input data of the servo system. Accordingly, an impulse response is added to the output of the servo system. That is, the disturbance directly affects the reading of a plurality of normal servo region samples succeeding the defective servo region.

Figure 2:
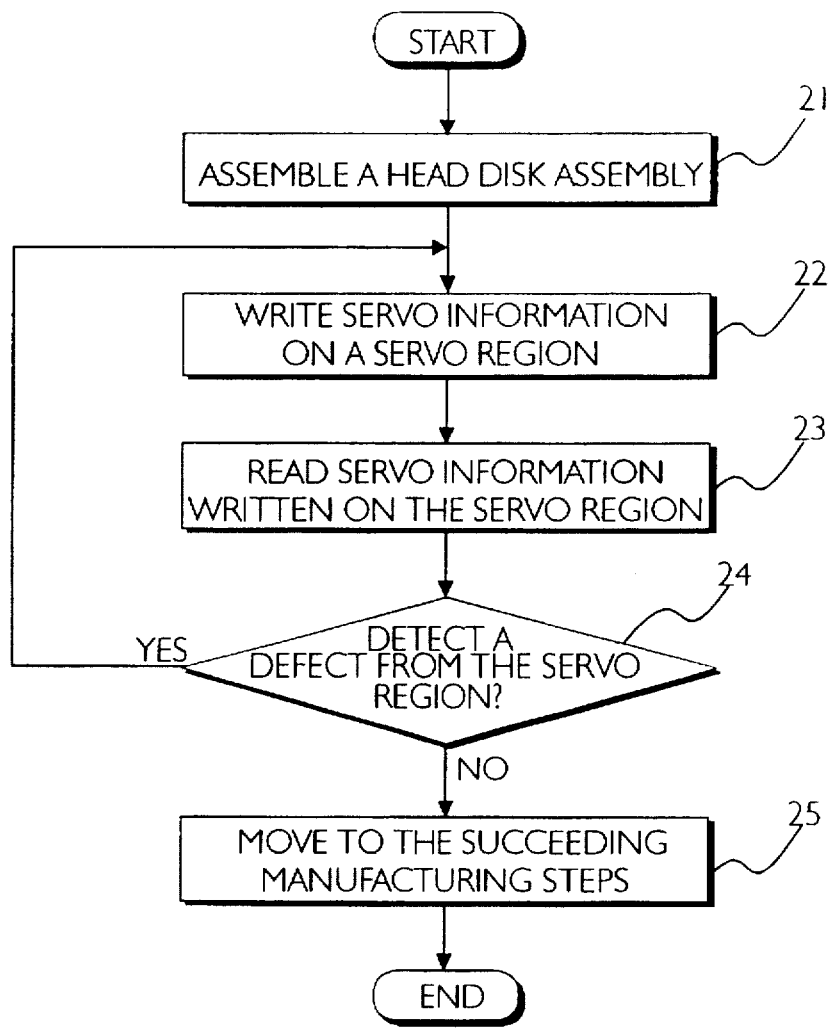
FIG. 2 is a flow chart illustrating a conventional servo writing and a defect detecting steps in a manufacturing process of a head disk assembly of a hard disk drive.

Referring to FIG. 2, a conventional hard disk drive assembly is shown including the general servo writing and a defect detecting steps during a manufacturing process of a head disk assembly of a hard disk drive. As shown in FIG. 2, the disk is assembled with a head assembly to produce a head disk assembly which is a half-finished product of the hard disk drive at step 21. Then, the servo information is written on a servo region of the disk by a servo writing device at step 22. Once the servo information is written on the servo region of the disk, the quality of the written servo information is verified. That is, the servo information written on the servo region of the disk is read out by the servo head under control of a central processing unit (CPU) for defect detection at step 23. Then, the CPU ascertains whether there is any defect in the servo region at step 24. If there is a defect in the servo region, the CPU controls the servo head to return to step 22 in order to repeat the servo writing and then defect detecting steps until there is no further defect in the servo region before moving on to the next manufacturing steps at step 25 so that servo information can be faithfully recorded on the servo region of the disk for reliable reproduction. That is, in the conventional servo information writing and defect detection steps, if there is a defect in the servo region, the servo information must be re-written and defect verification step must be repeated until there is no further defect. This, as I have observed, requires a significant processing time and assembly time which lead to a general decline in the production of a hard disk drive.

Figure 3:
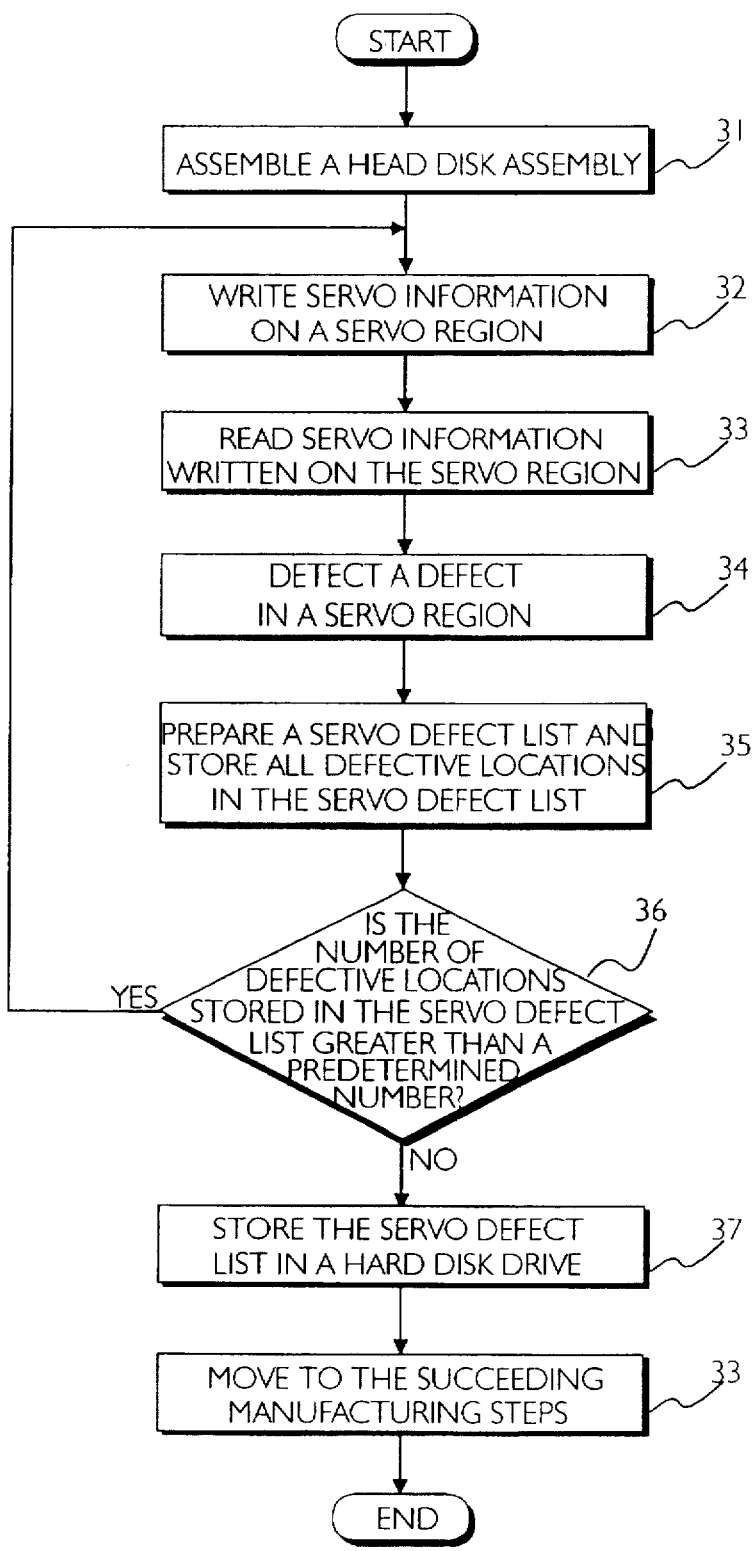
FIG. 3 is a flow chart illustrating a servo writing and a defect detecting steps in a manufacturing process of a head disk assembly constructed according to the principles of the present invention.

Turning now to FIG. 3 which illustrates a servo writing and a defect detecting steps in a manufacturing process of a head disk assembly, a half-finished product constructed according to the principles of the present invention. Referring to FIG. 3, a disk is assembled with a head assembly to manufacture a head disk assembly which is a half-finished product of a hard disk drive at step 31. Once the servo information is written on the servo region of the disk, the quality of the written servo information is then verified. That is, the servo information written on the servo region of the disk is read out by a servo head (not shown) under control of a central processing unit (CPU) for defect detection at step 33. Then, the CPU ascertains whether there is any defect in the servo reason from the servo information read out by the servo head at step 34 as the servo head moves in a radial direction of the data memory disk (e.g., from an outer track to an inner track of the data memory disk or from the inner track to the outer track). If there is a defect in the servo region, the CPU prepares a servo defect list and stores the first defective location and subsequently all the defective locations in a servo defect list at step 35 as the servo head moves in a radial direction of the disk and verifies the quality of all the servo information written on the servo region of the disk. As the servo head verifies the quality of the servo information written on the servo region of the disk, the CPU continuously gathers the defective locations in the servo defect list and concomitantly determines whether the number of the defective locations stored in the servo defect list is greater than, or alternatively, no less than a predetermined tolerable number determined by a manufacturer at step 36.

When the number of defective locations representing the number of defects in the servo region is greater than the predetermined tolerable number at step 36, the CPU returns to step 32 for controlling the servo head to re-write all the servo information on the servo region of the disk and re-read the servo information re-written on the servo region of the disk for quality control. However, if the number of defective locations is equal or less than the predetermined tolerable number after all the servo information written on the servo region of the disk is verified for defect, the CPU retains the servo defect list and allows the manufacturer to store in the hard disk drive at step 37 before moving on to succeeding manufacturing steps at step 38. For the purpose of this invention, the servo defect list is preferably stored on a disk media at a location that is reserved on the disk for the list so that the defective servo regions can be avoided for later use. However, different locations in the hard disk drive may also be available for storing such a servo defect list.

According to the preferable embodiment as shown in FIG. 3 of the present invention, all servo information of all tracks of the disk are written before they can read out for defect detection. However, the present invention also contemplates a situation where the writing, the reading, and servo defect detecting steps are repeated for each successive one of the plurality of tracks of the disk. That is, the servo information of the first track is written at step 32 before it can be read out at step 33 for defect detection at step 34. Moreover, while there may be a number of defects in the 1S servo information including position information of a data track written on the servo region of the disk, if the number of such defects is less than a tolerable number, the CPU can still control the servo head to accurately access to data tracks of the disk for data reproduction by way of estimation based on the position information of a preceding normal servo region. Meanwhile, the assembly time of the head disk assembly is significantly reduced and the productivity of a hard disk drive is greatly improved. Further, the effect of servo defects of a servo surface of the disk on succeeding normal servo regions in the hard disk drive can also be minimized.

Figure 4:
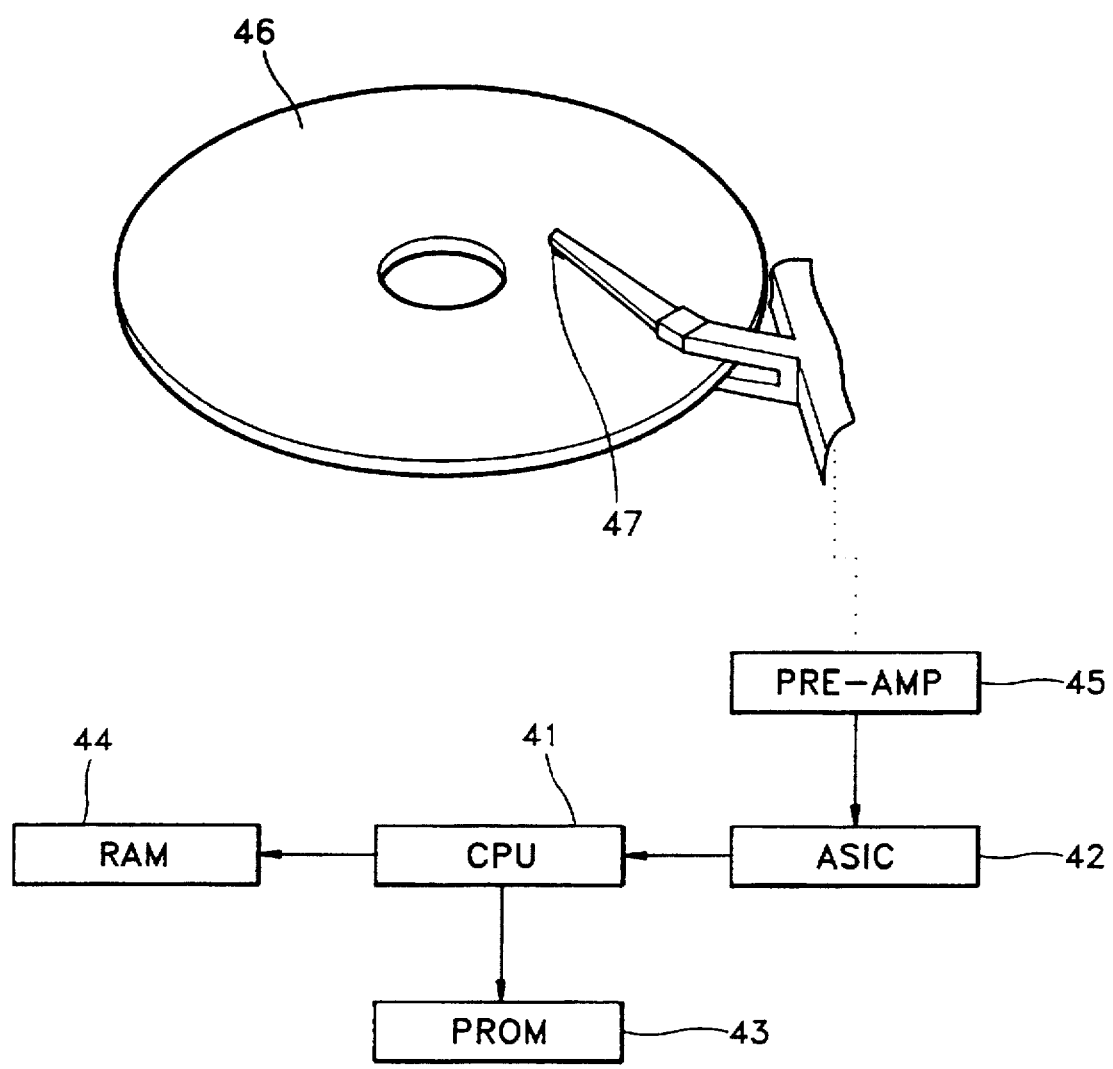
FIG. 4 is an explanatory diagram of a hard disk drive for controlling a servo system constructed according to the principles of the present invention.
Figure 5:
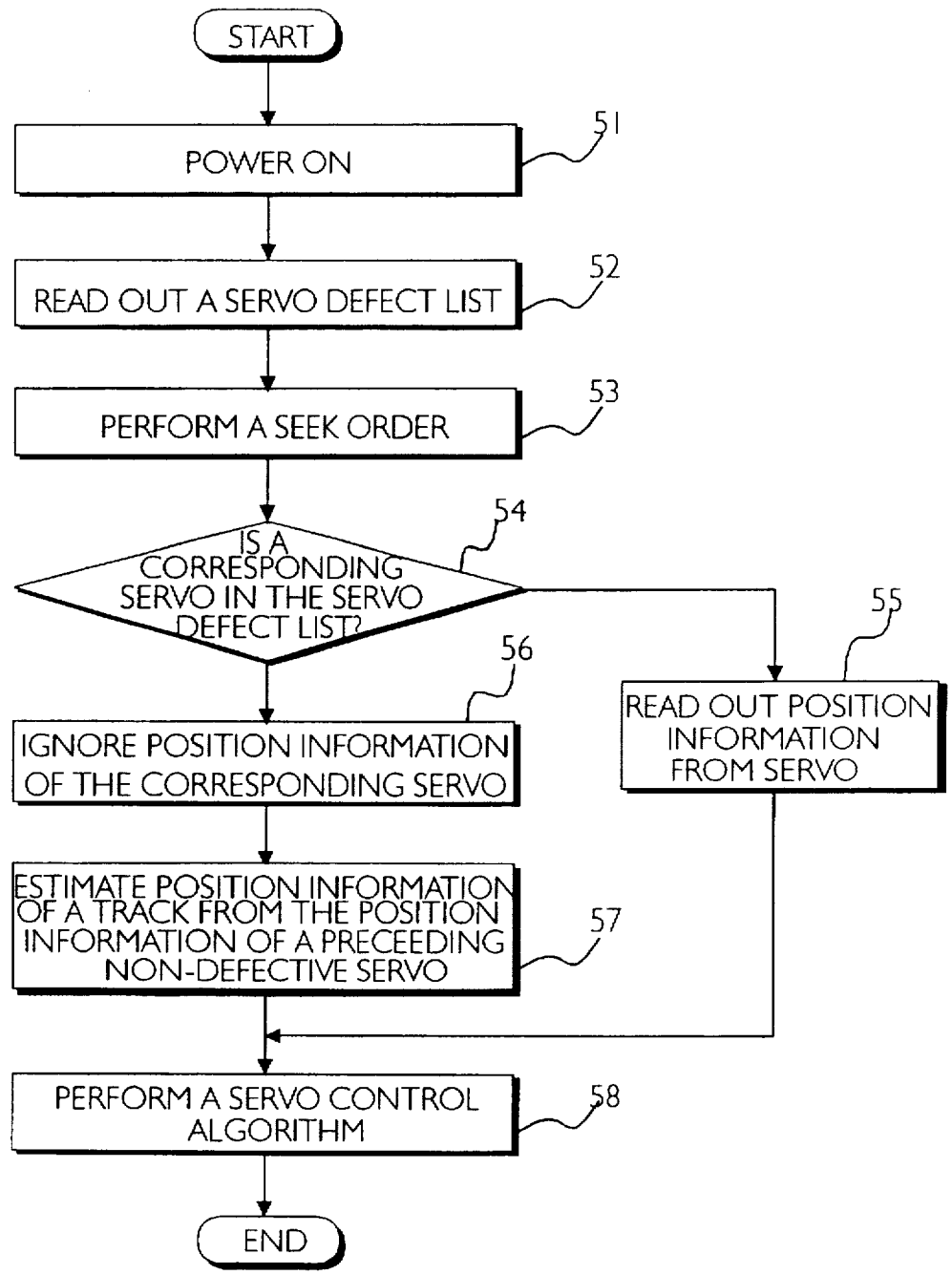
FIG. 5 is a flow chart illustrating a servo control method for controlling a servo system of a hard disk drive constructed according to the principles of the present invention.

Referring now to FIGS. 4 and 5, the method for controlling a servo system of the hard disk drive constructed according to the principles of the present invention will be explained as follows. As shown in FIG. 4, a hard disk drive system includes a data memory disk 46 and a head 47, a CPU 41, a PROM 43, a RAM 44, an ASIC 42 and a pre-amplifier 45. A control program corresponding to the flow chart of FIG. 5 is stored in PROM 43.

Referring to FIGS. 4 and 5, when power is applied to the hard disk drive at step 51, the servo defect list as stored in a predetermined location of the disk 46 is read out from the disk 46 of the hard disk drive by the servo head 47 under control of the CPU 41 and stored in the RAM 44 at step 52. The CPU 41 then controls the servo head 47 to perform a track seek order on the disk 46 at step 53 and determines whether a corresponding servo is in the servo defect list at step 54. If the corresponding servo is determined in the servo defect list, the position information of the corresponding servo is ignored at step 56. Then, position information of the track is estimated from the position information of a servo preceding the corresponding servo. Thereafter, a predetermined servo control algorithm is carried out by the above-estimated position information at step 58. As described above, since the position information of the corresponding servo in the servo defect list is not used, the position information having a defect can be prevented from acting as an impulsive disturbance. Meanwhile, if the corresponding servo is not in the servo defect list, the position information is read out from the servo at step 55, and the servo control algorithm is then carried out at step 58.

In the method for controlling a servo system of the hard disk drive according to the principles of the present invention, when the number of defects of the servo region is less than a predetermined tolerable number set by the manufacturer in the step of detecting the defect of a head disk assembly which is a half-finished product of the manufacturing process, the manufacturing process moves to the succeeding steps. Therefore, the method for controlling a servo system of the hard disk drive according to the principles of the present invention is capable of providing significant improvement in the production of the hard disk drive by reducing the necessary time for producing a finished product. Also, the normal position information is used instead of the position information of the corresponding servo in the servo defect list during the operation of the hard disk drive, whereby the disturbance is not prevented from acting as input data of the servo system and thus the system is stably operated.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for recording servo information on a plurality of tracks of a disk using a head which is capable of writing data and servo information on respective servo region and data region of each track and reading data and servo information from the servo region and data region of each track, said method comprising the steps of:

writing servo information on respective servo regions of successive ones of the plurality of tracks;

reading out the servo information written on the respective servo regions of successive ones of the plurality of tracks;

detecting for defects in the respective servo regions of successive ones of the plurality of tracks;

compiling all defective servo regions in a servo defect list;

determining whether the number of defective servo regions compiled in the servo defect list is not less than a predetermined number;

re-writing the servo information on respective servo regions of successive ones of the plurality of tracks for subsequent defect detection, when the number of defective servo regions compiled in the servo defect list is not less than said predetermined number; and storing the servo defect list on a predesignated location of the disk, when the number of defective servo regions compiled in the servo defect list is less than said predetermined number.

2. The method of claim 1, further comprising the steps of:

accessing the servo defect list stored on the predesignated location of the disk;

accessing data information stored in the data region of the tracks using the servo information stored in the servo region;

reading contents of the servo defect list while accessing the data information stored in the data region to determine whether access to the tracks will be impacted by defective servo regions contained in the servo defect list;

when access to the tracks is impacted by the defective servo regions contained in the servo defect list, accessing the data information stored in the data region based upon the servo information stored in a non-defective servo region preceding to the corresponding servo region; and when access to the tracks is not impacted by the defective servo regions contained in the servo defect list, accessing the data information stored in the data region based upon the servo information stored in the corresponding servo region.

3. A method for servo control of a hard disk drive, comprising the steps of:

writing a servo on a servo region of a disk;

detecting a defect of the servo region where said servo is written;

preparing a servo defect list when the defect of the servo region is detected;

ascertaining whether the number of defective locations contained in said servo defect list is not less than a predetermined number;

returning to writing said servo and repeating succeeding steps when the number of defective locations contained in said servo defect list is not less than said predetermined number; and storing said servo defect list on a predetermined location of said disk in said hard disk drive when the number of defective locations contained in said servo defect list is less than said predetermined number.

4. The method of claim 3, further comprising:

reading out said servo defect list from the predetermined location of said disk in said hard disk drive;

performing a track seek order on said disk;

ascertaining whether a corresponding servo is in the servo defect list;

ignoring position information of the corresponding servo, when the corresponding servo is in the servo defect list;

estimating position information of a track from position information of a servo immediately preceding the corresponding servo after ignoring the position information of the corresponding servo;

performing a predetermined servo control algorithm after estimating the position information of the corresponding servo based on the position information of the servo immediately preceding the corresponding servo; and performing said servo control algorithm after reading out the position information from said corresponding servo, when the corresponding servo is not in the servo defect list.

5. A method for defect management of a recording medium, comprising the steps of:

writing servo information on respective servo regions of successive tracks of said recording medium having a plurality of tracks with each track containing a servo region and a data region;

reading the servo information written on the respective servo regions of successive tracks of said recording medium;

detecting for defects in the respective servo regions of successive tracks of said recording medium;

compiling a servo defect list of defective servo regions of said recording medium containing said defects;

determining whether the number of defective servo regions compiled in the servo defect list is less than a predetermined number;

when the number of defective servo regions compiled in the servo defect list is not less than said predetermined number, re-writing the servo information on respective servo regions of successive tracks of said recording medium for subsequent of detection of defects; and when the number of defective servo regions compiled in the servo defect list is less than said predetermined number, storing the servo defect list on a designated location of said recording medium.

6. The method of claim 5, further comprising the steps of:

accessing the servo defect list stored on said designated location of said recording medium; accessing data information stored in the data region of the tracks of said recording medium using the servo information stored in the servo region;

reading contents of the servo defect list while accessing the data information stored in the data region to determine whether access to the tracks of said recording medium will be impacted by defective servo regions contained in the servo defect list;

when access to the tracks is impacted by the defective servo regions contained in the servo defect list, accessing the data information stored in the data region of a corresponding track of said recording medium based upon the servo information stored in a non-defective servo region preceding to the corresponding servo region; and when access to the tracks is not impacted by the defective servo regions contained in the servo defect list, accessing the data information stored in the data region of a corresponding track of said recording medium based upon the servo information stored in the corresponding servo region.

7. The method of claim 5, further comprising the steps of:

reading the servo defect list from said designated location of said recording medium;

performing a track seek operation on said recording medium;

ascertaining whether a servo region of a corresponding track of said recording medium is in the servo defect list;

when the servo region of the corresponding track is in the servo defect list, ignoring position information stored in the servo region of the corresponding track of said recording medium, estimating position information of a designated track of said recording medium from position information of a servo region immediately preceding the servo region of the corresponding track after ignoring the position information of the servo region of the corresponding track, and performing a predetermined servo control algorithm; and when the servo region of the corresponding track is not in the servo defect list, performing said servo control algorithm after reading position information from said servo region of the corresponding track.

8. The method of claim 5, further comprised of said recording medium corresponding to a magnetic disk.

9. The method of claim 6, further comprised of said recording medium corresponding to a magnetic disk.

10. The method of claim 7, further comprised of said recording medium corresponding to a magnetic disk.

* * * * *

UNITED STATES PATENT AND TRADEMARK OFFICE
CERTIFICATE OF CORRECTION

PATENT NO. : 5,798,883
DATED : 25 August 1998
INVENTOR(S) : Hack-Bin Kim

It is certified that error appears in the above-indentified patent and that said Letters Patent is hereby corrected as shown below:

Column 10, line 14, insert the following claims:

--13. A method for defect management of a recording medium, comprising the steps of:

reading a servo defect list from a designated location of said recording medium comprising a plurality of tracks with each track containing a servo region and a data region;

performing a track seek operation on said recording medium;

ascertaining whether a corresponding servo is in the servo defect list;

ignoring position information of the corresponding servo, when the corresponding servo is in the servo defect list;

estimating position information of a current track based upon position information of a servo immediately preceding the corresponding servo after ignoring the position information of the corresponding servo;

Performing a predetermined servo control algorithm after estimating the position information of the corresponding servo based upon the position information of the servo immediately preceding the corresponding servo; and performing said servo control algorithm after reading the position information from the corresponding servo, when the corresponding servo is not in the servo defect list.

UNITED STATES PATENT AND TRADEMARK OFFICE
CERTIFICATE OF CORRECTION

PATENT NO. : 5,798,883
DATED : 25 August 1998
INVENTOR(S) : Hack-Bin Kim

It is certified that error appears in the above-indentified patent and that said Letters Patent is hereby corrected as shown below:

IN THE CLAIMS

--14. The method of claim 13, further comprised of preparing said servo defect list and storing said servo defect list on said designated location of said recording medium prior to said reading said servo defect list on said designated location of said recording medium for performing the track seek operation.

--15. The method of claim 14, further comprised of said recording medium corresponding to a magnetic disk.

Signed and Sealed this

Second Day of February, 1999

*Attest:*

*Attesting Officer*

*Acting Commissioner of Patents and Trademarks*